Jan. 16, 1934.   C. R. PATON   1,943,547
MOTOR VEHICLE
Filed July 15, 1932

Inventor
CLYDE R. PATON.
By
Attorney

UNITED STATES PATENT OFFICE 1,943,547

MOTOR VEHICLE

Clyde R. Paton, Birmingham, Mich., assignor to Packard Motor Car Company, Detroit, Mich., a corporation of Michigan Application July 15, 1932. Serial No. 622,683

13 Claims. (Cl. 180—64)

This invention relates to motor vehicles and particularly to means for dampening the effect of road and motor movements on the frame of the vehicle.

It has long been known that internal combustion engines as used in automobiles have a tendency to transfer vibrations, originating in the engine, to the frame of the vehicle and a great deal of work has been done in an effort to reduce the sensible effect of such vibrations. One such method is to mount the motor on resilient supports made of rubber or springs, but when this practice is followed, objections arise due to the magnitude of the motor movement which is permitted by the resilient support, and which is excessive, provided enough resiliency is available in order to prevent the transfer of extreme motor vibrations to the frame. Various means of obtaining resiliency without large movement have been proposed. One of these is to insert frictional material within the rubber, another is to provide an extension on the motor, said extension being connected to the vehicle frame in such a way as to provide a dampening resistance to extreme motor movements.

In addition to the above work on vibration, there is also another large field of endeavor which has been directed, not to reducing motor vibrations, but to reducing the effect of the road irregularities transferred to the frame through the springs, upon movements of the axle caused by said irregularities. Various types of shock absorbers have been developed, operating on various principles, for the purpose of smoothing out road vibrations sensed in this manner.

It is an object of this invention to combine the above mentioned separated motor and road vibration dampening devices into a single unit for performing both functions.

Another object of the invention is to mount a vehicle shock absorber in such a way as to enable it to dampen vibrations transmitted to the frame from the motor and/or the axle.

A further object of the invention is to provide a resilient motor mounting having associated therewith suitable means for dampening the motor vibrations by a hydraulic shock absorbing action.

Still another object of the invention is to provide a resilient motor mounting having associated therewith suitable means for dampening the motor vibrations, said means being associated with the axle of the vehicle.

Other objects of the invention will appear from the following description taken in connection with the drawing, which forms a part of this specification, and in which.

Figure 1:
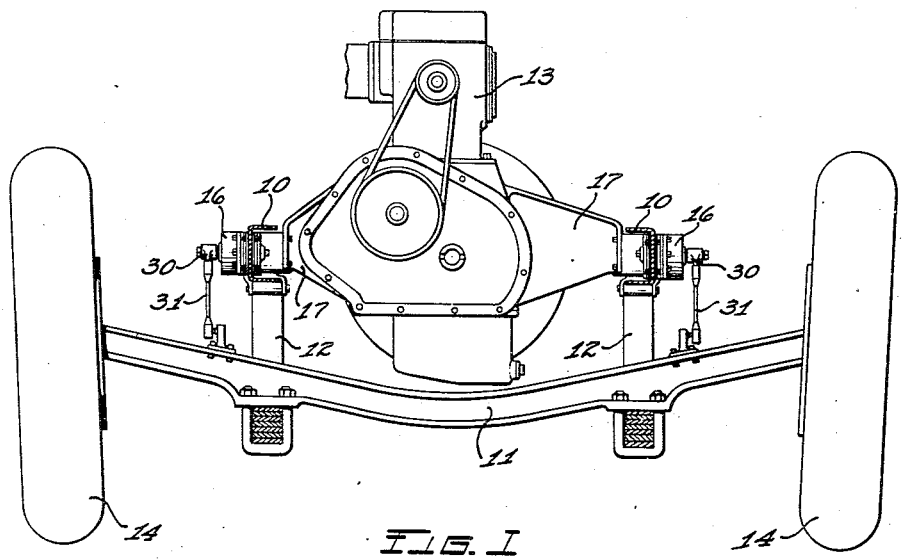
Fig. 1 is a front view of a motor vehicle chassis having parts thereof cut away to show the invention as applied.
Figures 2, 3:
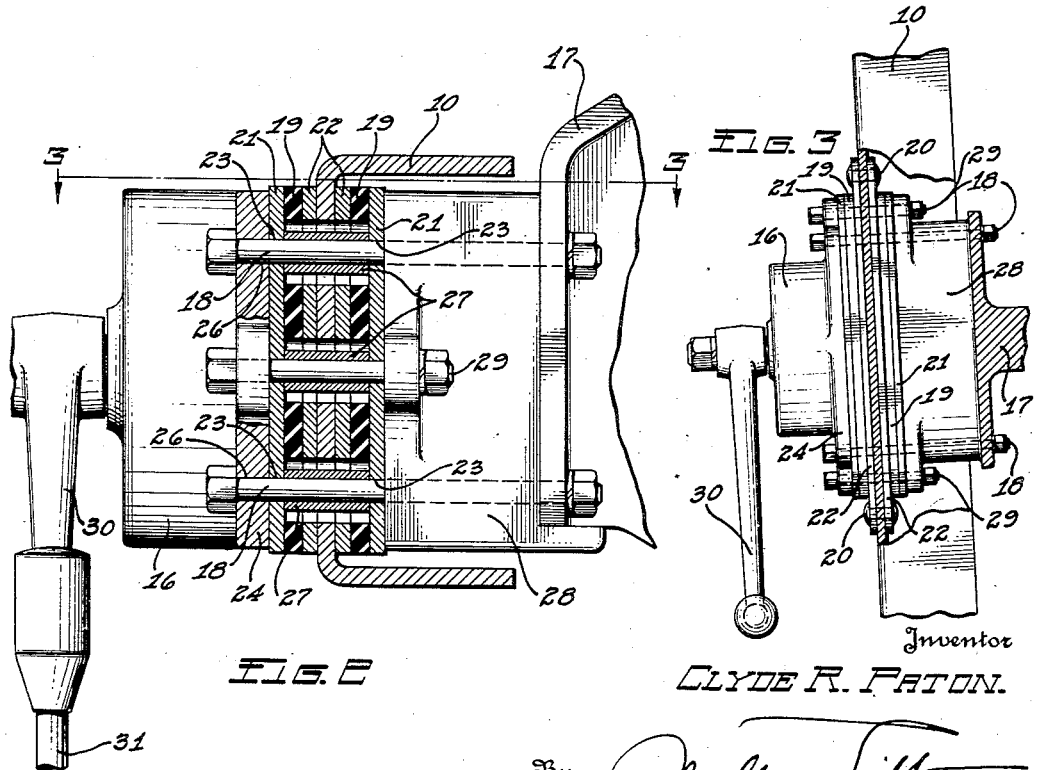
Fig. 2 is an enlargement of a portion of Fig. 1.
Fig. 3 is a sectional view, on a reduced scale, taken substantially on the line 3—3 of Fig. 2.

Referring to the drawing, 10 illustrates a motor vehicle frame side rail, 11 an axle, connected by springs 12, to the frame, and 13 the engine mounted in the vehicle frame. Suitable wheels 14 support the axle 11 and the usual springs 12 support the frame on the axle.

To dampen the effect of road vibrations transmitted to the frame through the springs, I provide, on each side rail, a shock absorber 16. The shock absorber shown can be of the hydraulic type shown in Moorhouse Patent No. 1,851,679, dated March 29, 1932, though it will be understood that various other forms of shock absorbers could be used.

The connection between the motor and the shock absorber is preferably rigid but both the motor and the shock absorber are connected to the frame through a flexible connection which permits relatively free movement between the motor-shock-absorber assembly and the frame side rails. The shock absorber, in turn, is operatively connected to the axle in a conventional manner as by the arm 30 and link 31. Thus, axle movements will be damped by the shock absorber operating against the mass of the motor, and, if this proves insufficient to damp axle movements, the shock-absorber-motor assembly will move, with respect to the frame, stretching the flexible resilient connection between the assembly and the frame. Motor movements will also be damped independently of the frame by the shock absorber.

Projecting from the motor are suitable supporting arms 17 through which pass suitable bolts 18 which hold the motor to the motor support. The motor support, itself, includes a pair of resilient pads 19, preferably of rubber, each pad being vulcanized to a suitable plate 21 on one side and to plate 22 on the other side. The plates 22 may be rigidly attached to the frame outside the limits of the rubber pads by suitable bolts or rivets 20. Through suitable apertures 23 in the plate 21 project the bolts 18, and thus when a rubber pad and plate assembly is placed on each side of the web of the frame side rail 10 and riveted thereto as at 20, the bolts 18 will constrain the plates 21 to move therewith with respect to the frame in a manner to be later described; such movement being accompanied by resilient deformation of the rubber pads.

I have shown the shock absorber 16 as having a supporting base or casing 24 through which project apertures 26 for the reception of the bolts 18. In assembling the shock absorber and the motor to the vehicle frame side rail 10, I first place these two parts on opposite sides of the frame side rail, pass bolts 18 through the apertures in the shock absorber base 24, the plates 21, and the motor arm, and tighten up on the bolts. In order not to compress the rubber pads 19 too much, suitable spacers 27 may be provided between the plates 21, the plates 22 being apertured to receive the spacers and permit relative movement between the motor-shock-absorber assembly and the frame without interferring with the plates.

It is thus evident that each shock absorber base or casing 24 and the associated motor arm 17 will be constrained to move together, but that they both may move with respect to the frame side rail 10 by virtue of the flexibility of the rubber pads 19.

The drawing shows a spacing member 28 inserted between the motor arm 17 and its adjacent steel plate 21, said spacing member projecting laterally of the frame side rail beyond its flange. This spacing member is merely an assembly aid, in that it permits insertion of the motor arms 17 within the space between the opposite side rails and serves merely as an extension of the motor arm as far as the mounting is concerned.

For assembly purposes, it may be desirable to bolt the spacing member 28 and the shock absorber rigidly together as by bolts 29 passing through the rubber webs and the steel plates in the same manner as the bolts 18. Thus, the bolts 18 may be disconnected and the motor removed from the frame without disturbing the shock absorber and its connection to the frame.

It is thus seen that I have a motor vehicle structure in which the motor is yieldably connected to the frame and rigidly connected to the shock absorber, in which the shock absorber is yieldably connected to the axle and resiliently connected to the frame, and in which the frame and axle are resiliently connected independently of the connection between them through the shock absorber.

With the vibration reducing system shown, if we assume for the moment that the axle and frame are stationary, we see that initial motor movement with respect to the frame and axle, stresses the rubber pads, which form a resilient connection, and moves the shock absorber 16 with respect to both the frame and the axle. Insofar as either the shock absorber or the rubber is stressed before the other, such damping action as may occur between the motor and the stationary parts may be said to be independent of the frame or the shock absorber depending upon which damping means is stressed first. Further rocking movement of the motor will stress the rubber pads to the limit, at which point they will have a tendency to create torsional frame movement about an axis longitudinal of the frame. In the extreme case, it is possible to assume that the rubber will have been twisted by such movement to the limit of its action and then any further motor rocking will be damped almost entirely by the shock absorber which acts, of course, on the mass of the axle and wheel assembly.

Considering now that the motor and frame are stationary and that the axle is subjected to movements relative to these two parts, we find that the vehicle springs and the shock absorbers both exert a restraining tendency on such axle movement, the springs almost immediately and the shock absorbers also immediately. The shock absorber, being rigidly connected to the motor and resiliently or yieldably connected to the frame, can exert no greater damping force than the inertia of the motor will permit, at least as far as initial action is concerned. Further force applied to the shock absorber by the axle and transmitted thereby to the motor and the rubber webs then begins to stress these latter and as they become stressed, the inertia of the frame is increasingly available through the shock absorber as well as through the springs as a further damping means for the axle movement.

In some types of motor vehicles, it has been found that certain forces, some of them independent of the axle and the motor, have been responsible for torsional oscillation of the frame side rails about an axis substantially parallel to the frame and somewhere midway between the side rails. Let us consider, then, vibration of this nature occurring with the motor and the axle relatively stationary. This condition does not as a rule frequently occur, but when it occurs it is seen that the construction shown transmits to the frame a damping force by virtue of the rubber webs connecting the motor-shock-absorber assembly to the frame, and such damping tendency is low to begin with but rapidly increases as the rubber is stressed and begins to carry along with the frame the mass of the motor and axle. Under certain conditions this type of restraining action is found to be desirable.

Another way of viewing the above described construction is to consider it a plurality of connections, one connection being a rigid shock absorber to motor connection and a second resilient or yieldable connection between the rigid connection, or a part of it, and the frame. Still another way of considering the connections is to call the first one a shock absorbing connection between the motor and the axle and the second a vibration reducing supporting connection between the first connection and the frame.

I have thus provided an inter-connection between the motor, the axle and the frame which serves to dampen motor movements with respect to the frame, axle movements with respect to the frame, and frame movements with respect to both the motor and the axle.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a motor vehicle having a frame, a motor, and an axle, the combination with a shock absorbing connecting means between the motor and the axle of a resilient connecting means between said shock absorbing connection and said frame.

2. In a motor vehicle having a frame, a motor, an axle, and a shock absorber associated with said axle, the combination with a connecting means between said motor and said shock absorber, of a resilient connecting means between said first named connection and said frame.

3. In a motor vehicle having a frame, an axle, a shock absorber associated with said axle, and a motor, resilient connecting means between said shock absorber and said frame, and rigid connecting means between said motor and said shock absorber.

4. In a motor vehicle having a frame, an axle, a shock absorber resiliently connected to said frame and yieldably associated with said axle, and a motor, rigid means directly connecting said shock absorber and said motor.

5. In a motor vehicle having a motor, a shock absorber and a frame, rigid inter-connecting means detachably connecting said motor and said shock absorber, and yieldable connecting means between said motor and said frame, each of said connecting means co-operating to retain said shock absorber in association with said frame when said motor is disconnected from said vehicle.

6. In a motor vehicle having a motor; a shock absorber; and a frame; rigid inter-connecting means detachably connecting said motor and said shock absorber, and yieldable connecting means between said shock absorber and said frame, said rigid means including an element co-operating with said yieldable means to maintain said shock absorber in operative relationship with said frame upon detachment of said motor from said interconnecting means.

7. In a motor vehicle, a frame, a motor resiliently associated with the frame, an axle, a shock absorber, a yieldable connection between said axle and said shock absorber, and a rigid connection between said motor and said shock absorber.

8. In a motor vehicle having a frame, a motor, and an axle, a vibration reducing system comprising vibration reducing means connected between said axle and said motor and yieldable means connecting said vibration reducing means to said frame.

9. In a motor vehicle, a frame member, a shock absorber on one side of the frame member, a motor arm on the other side of the frame member, resilient means intermediate the frame member and the shock absorber and the frame member and the motor arm, means fixing the shock absorber and the motor arm rigidly together, a portion of said means extending through and being movable relative to the frame member.

10. In a motor vehicle, a frame member, a shock absorber on one side of the frame member, a motor arm on the other side of the frame member, rubber pads intermediate the frame member and the shock absorber and the frame member and the motor arm, means fixing the shock absorber and the motor arm rigidly together, a portion of said means extending through and being movable relative to the frame member.

11. In a motor vehicle, a frame, a shock absorber on one side of the frame, a motor bracket on the other side of the frame, means rigidly attaching the bracket to the shock absorber, and yieldable means between the frame and both the shock absorber and the bracket.

12. In a motor vehicle, a frame having openings therethrough, a shock absorber on one side of the frame, a motor arm bracket on the other side of the frame, spacing members between the shock absorber and the bracket extending through the openings in the frame and movable relative to the frame, resilient connecting means between the frame and both the shock absorber and the bracket, and means extending through the spacing members securing the bracket and the shock absorber rigidly together.

13. In a motor vehicle, a frame having openings therethrough, a shock absorber on one side of the frame, a motor bracket on the other side of the frame, means securing the bracket and the shock absorber rigidly together, resilient connecting means between the frame and both the shock absorber and bracket, said shock absorber and bracket being movable relative to the frame, a motor supported by the bracket, and means for detachably securing the motor to the bracket.

CLYDE R. PATON.